US008879092B2

(12) United States Patent
Gha et al.

(10) Patent No.: US 8,879,092 B2
(45) Date of Patent: Nov. 4, 2014

(54) METHOD AND APPARATUS FOR PRINTING DATA WITH PREDETERMINED FORMAT USING BLUETOOTH COMMUNICATION, AND METHOD OF STORING TEMPLATE DATA

(75) Inventors: Hwang-hyeon Gha, Suwon-si (KR); Tae-jung Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1810 days.

(21) Appl. No.: 12/042,364

(22) Filed: Mar. 5, 2008

(65) Prior Publication Data

US 2009/0002751 A1 Jan. 1, 2009

(30) Foreign Application Priority Data

Jun. 27, 2007 (KR) ........................ 10-2007-0063899

(51) Int. Cl.
  *G06F 3/00* (2006.01)
  *H04B 7/00* (2006.01)
  *G06F 3/12* (2006.01)
  *H04M 1/725* (2006.01)

(52) U.S. Cl.
  CPC ........... *H04M 1/7253* (2013.01); *G06F 3/1208* (2013.01); *G06F 3/1247* (2013.01); *G06F 3/1209* (2013.01); *G06F 3/1292* (2013.01); *G06F 3/1257* (2013.01); *H04M 2250/02* (2013.01); *G06F 3/1236* (2013.01)
  USPC ........................................ 358/1.15; 455/41.3

(58) Field of Classification Search
  USPC ................................. 358/1.15, 1.18
  See application file for complete search history.

(56) References Cited

U.S. PATENT DOCUMENTS

| 6,006,281 | A  | * | 12/1999 | Edmunds ........................... 710/1 |
| 6,498,657 | B1 | * | 12/2002 | Kuntz et al. ................... 358/1.15 |
| 2002/0132584 | A1 | * | 9/2002 | Izumi ............................... 455/41 |
| 2005/0113025 | A1 | * | 5/2005 | Akamatsu et al. ........... 455/41.3 |

FOREIGN PATENT DOCUMENTS

| JP | 2005-050300 | 2/2005 |
| JP | 2005-316857 | 11/2005 |

OTHER PUBLICATIONS

Chinese Office Action mailed Mar. 12, 2012 issued in corresponding Chinese Patent Application No. 200810091126.9.

(Continued)

*Primary Examiner* — Benny Q Tieu
*Assistant Examiner* — Sunil Chacko
(74) *Attorney, Agent, or Firm* — Staas & Halsey LLP

(57) ABSTRACT

A method and apparatus for printing data with a predetermined format transmitted from a terminal device using Bluetooth communication. The method includes receiving the data having the predetermined format from the terminal device using Bluetooth communication; combining the received data having the predetermined format with template data corresponding to the terminal device stored in a printing apparatus; and printing the combined data. Accordingly, it is possible to obtain the same printing result even when different printing apparatuses print the data by transmitting the data with the predetermined format from the terminal device to the different printing apparatuses using Bluetooth communication, and to obtain the same printing result when printing the data with the predetermined format by transmitting the data with the predetermined format from the terminal device or transmitting data obtained by combining the data with the predetermined format with the template data from the terminal device.

24 Claims, 9 Drawing Sheets

(56) References Cited

OTHER PUBLICATIONS

Second Chinese Office Action issued Sep. 24, 2012 in corresponding Chinese Patent Application No. 200810091126.9
Chinese Office Action mailed Feb. 1, 2013 for corresponding Chinese Application No. 200810091126.9.

Korean Notice of Allowance issued Nov. 20, 2013 in corresponding Korean Application No. 10-2007-0063899.

Korean Notice of Non-Final Rejection issued Aug. 28, 2013 in corresponding Korean Application No. 10-2007-0063899.

* cited by examiner

FIG. 6

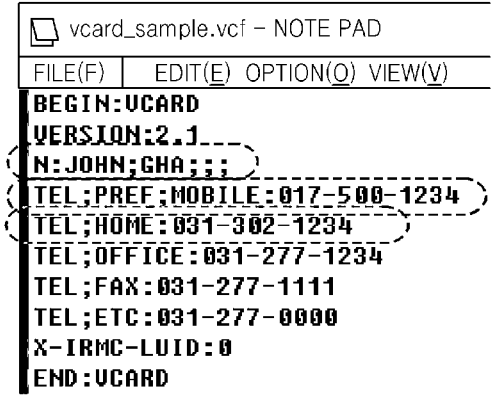

FIG. 7

```
<td class="cell_name_odd" style="height: 105mm;">
        <div class="div_name">JOHN GHA</div>
</td>
<td class="cell_details_odd" style="height: 105mm;">
        <div class="div_details">Mobile : 017-500-1234</div>
        <div class="div_details">Home : 031-302-1234</div>
        <div class="div_details">Office : 031-277-1234</div>
        <div class="div_details">Fax : 031-277-1111</div>
        <div class="div_details">ETC : 031-277-0000</div>
        <div class="div_details"></div>
</td>
```

FIG. 8

FIG. 9

```
vcard_sample.vcf - NOTE PAD
FILE(F)  EDIT(E)   OPTION(O)  VIEW(V)
BEGIN:VCARD
VERSION:2.1
N:JOHN;GHA;;;
TEL;PREF;MOBILE:017-500-1234
TEL;HOME:031-302-1234
TEL;OFFICE:031-277-1234
TEL;FAX:031-277-1111
TEL;ETC:031-277-0000
ADD;SUWON CITY
X-IRMC-LUID:0
END:VCARD
```

FIG. 10

```
<td class="cell_name_odd" style="height: 105mm;">
        <div class="div_name"></div>
</td>
<td class="cell_details_odd" style="height: 105mm;">
        <div class="div_details">Mobile : </div>
        <div class="div_details">Home : </div>
        <div class="div_details">Office :</div>
        <div class="div_details">Fax : </div>
        <div class="div_details">ETC : </div>
        <div class="div_details"></div>
</td>
```

FIG. 11

```
<td class="cell_name_odd" style="height: 105mm;">
        <div class="div_name"></div>
</td>
<td class="cell_details_odd" style="height: 105mm;">
        <div class="div_details">Mobile : </div>
        <div class="div_details">Home : </div>
        <div class="div_details">Office :</div>
        <div class="div_details">Fax : </div>
        <div class="div_details">ETC : </div>
        <div class="div_details">ADD : </div>
        <div class="div_details"></div>
</td>
<td class="cell_notes_odd" style="height: 105mm;">
```

FIG. 12

| TERMINAL DEVICE BD ADDRESS | DATA TYPE | TEMPLATE ID |
|---|---|---|
| 11:22:33:44:55:66 | vCard | 66_Card_00 |
| | | 66_Card_01 |
| | vNote | 66_Note_00 |
| | vMessage | 66_Msg_00 |
| | | 66_Msg_01 |
| 11:22:33:44:55:77 | vCard | 77_Msg_00 |
| | | 77_Msg_01 |
| | | 77_Msg_02 |
| | vNote | 77_Note_00 |
| | vMessage | 77_Msg_00 |
| | | 77_Msg_01 |

METHOD AND APPARATUS FOR PRINTING DATA WITH PREDETERMINED FORMAT USING BLUETOOTH COMMUNICATION, AND METHOD OF STORING TEMPLATE DATA

CROSS-REFERENCE TO RELATED APPLICATIONS

This application claims the benefit of Korean Patent Application No. 2007-63899, filed in the Korean Intellectual Property Office on Jun. 27, 2007, the disclosure of which is incorporated herein by reference.

BACKGROUND OF THE INVENTION

1. Field of the Invention

Aspects of the present invention relate to a method and apparatus for printing data with a predetermined format from a terminal device using Bluetooth communication.

2. Description of the Related Art

Recently, short-range wireless communications within a range of about 10 m have been developed. Even though a conventional wireless LAN has a valid transmission range equal to or greater than 100 m, short-range wireless communication has a shorter transmission range. Since the power used in short-range wireless communications is low, short-range wireless communication is suitable for an information processing apparatus having a limited battery capacity, such as a mobile phone and a personal digital assistant (PDA). The short-range wireless communication method includes a Bluetooth communication method. Recently, a terminal device, such as a mobile phone and a PDA, which has a communication function according to Bluetooth specifications, and a conventional printing apparatus for printing data received from the terminal device using Bluetooth communication, have been distributed.

Bluetooth communication supports the transmission of data with a predetermined format, such as vCard, vCalendar, vMessage, and vNote. When printing the data with one of the aforementioned formats from the terminal device using Bluetooth communication, the terminal device transmits the data with the aforementioned predetermined format or transmits data obtained by combining the vCard data with template data. When the terminal device transmits the vCard data, a "send" command is input from the terminal device. When the terminal device transmits the data by combining the vCard data with the template data, a "print" command is input from the terminal device. The terminal device transmits data using an object push profile (OPP) in response to the "send" command, and transmits data using a basic printing profile (BPP) in response to the "print" command.

When the conventional printing apparatus receives vCard data from the terminal device, the conventional printing apparatus combines the vCard data with template data provided by the conventional printing apparatus and prints the combined data. When the conventional printing apparatus receives data obtained by combining vCard data with template data, the conventional printing apparatus prints the received data without additional processing.

The template data provided by the conventional printing apparatuses are different from one another depending on the particular printing apparatus. Accordingly, when transmitting the same vCard data from a terminal device to the conventional printing apparatuses, printing results printed by the conventional printing apparatuses differ. In addition, template data used for combining vCard data with template data in the terminal device may differ from the template data that is provided by the conventional printing apparatus. Accordingly, the printing result obtained by transmitting vCard data is different from the printing result obtained by transmitting combined vCard and template data.

SUMMARY OF THE INVENTION

Aspects of the present invention provide a method and apparatus for printing data capable of obtaining the same printing result even when different printing apparatuses print data with a predetermined format by transmitting the data with the predetermined format from a terminal device to the different printing apparatuses using Bluetooth communication, and capable of obtaining the same printing result when printing data with a predetermined format by transmitting the data with the predetermined format from the terminal device or transmitting data obtained by combining data with a predetermined format with template data from the terminal device, and a computer-readable recording medium having embodied thereon a computer program to execute the method.

According to an aspect of the present invention, a method of printing data having a predetermined format is provided. The method includes receiving the data having the predetermined format from the terminal device using Bluetooth communication; and combining the received data having the predetermined format with template data corresponding to the terminal device and stored in a printing apparatus, and printing the combined data.

According to another aspect of the present invention, the method further includes receiving combination data including the data having the predetermined format and template data from the terminal device; and extracting the template data from the received combination data and storing the extracted template data as the stored template data corresponding to the terminal device.

According to another aspect of the present invention, the predetermined format is at least one of a plurality of formats including a vCard format, a vCalendar format, a vMessage format, and a vNote format.

According to another aspect of the present invention, the method further comprises mapping and storing the template data corresponding to the terminal device with identification information of the terminal device.

According to another aspect of the present invention, the extracting of the template data comprises storing the extracted template data, or updating the previously stored template data with the extracted template data, when the template data corresponding to the terminal device is already stored.

According to another aspect of the present invention, the method further includes updating the stored template data when at least one attribute that is not included in the stored template data is included in the received data with the predetermined format.

According to another aspect of the present invention, the combination data and the template data are an XHTML-Print type.

According to another aspect of the present invention, an apparatus to print data having a predetermined format is provided. The apparatus includes a communication unit to receive data having the predetermined format from a terminal device using Bluetooth communication; a storage unit to store template data corresponding to the terminal device; a printing data generator to combine the received data having the predetermined format with the stored template data and to generate print data using the combined data; and a printing unit to print the generated print data.

According to another aspect of the present invention, a computer readable recording medium is provided, having recorded thereon a method of printing data with a predetermined format, the data being received from a terminal device using Bluetooth communication.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates an example of a vCard data file;

FIG. 7 illustrates an example of a combination data file obtained by combining vCard data with template data, according to an embodiment of the present invention;

FIG. 8 illustrates an example of a result of printing data obtained by combining vCard data with template data;

FIG. 9 illustrates another example of a vCard data file;

FIG. 10 illustrates an example of template data stored in a printing apparatus;

FIG. 11 illustrates an example of template data that is updated according to an embodiment of the present invention; and FIG. 12 illustrates an example of a type in which template data is stored in a storage unit according to an embodiment of the present invention.

DETAILED DESCRIPTION OF THE EMBODIMENTS

Figure 1:
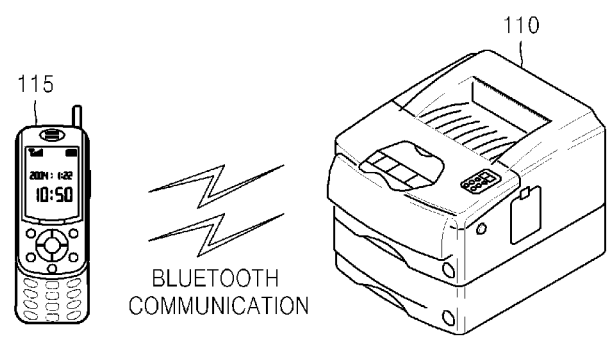
FIG. 1 is a schematic diagram illustrating a printing system that prints data that is transmitted from a terminal device using Bluetooth communication, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram illustrating a printing system that prints data transmitted from a terminal device 115 using Bluetooth communication, according to an embodiment of the present invention. The printing system includes a printing apparatus 110 and the terminal device 115. Although a single printing apparatus 110 and a single terminal device 115 are shown in FIG. 1, the present invention is not limited thereto. The printing system may include a plurality of printing apparatuses 110 and a plurality of terminal devices 115. In this case, the terminal devices 115 can communicate data with the printing apparatuses 110 through Bluetooth communication.

The printing apparatus 110 may be a printer, a facsimile machine, or a multi-function device. The terminal device 115 can transmit data that is to be printed to the printing apparatus 110. The terminal device 115 may be a mobile phone, a camera, a personal digital assistant, or a personal computer (PC). The terminal device 115 and the printing apparatus 110 can communicate data with each other using a Bluetooth communication method, or other wireless communication method. As can be seen from the following description, aspects of the present invention are not limited to Bluetooth communication. Any form of wireless communication can be used, such as short range wireless communication. The terminal device 115 transmits data to the printing apparatus 110 with a predetermined format, such as a vCard format, a vCalendar format, an iCalendar format, a vMessage format, a vNote format, and the like. The printing apparatus 110 can combine the received data having the predetermined format with template data stored in the printing apparatus 110 in order to print the combined data.

The vCard format and the vCalendar format are defined by the Internet Mail Consortium and related to input and schedule management for an electronic business card and a calendar, respectively. The vMessage format and the vNote format are defined by Infrared mobile communication and are respectively related to a message and a note.

When the terminal device 115 transmits data obtained by combining the data having the predetermined format with the template data, the printing apparatus 110 may print the received data without changing the data. For convenience of description, hereinafter the data with the predetermined format is referred to as format data, and the data obtained by combining the format data with the template data is referred to as combination data. For example, data in the vCard format is referred to as vCard data.

The terminal device 115 can use an object push profile (OPP) as a profile to transmit format data. The terminal device 115 can use a basic printing profile (BPP) as a profile to transmit combination data. A profile is a rule that defines how to use a protocol for each application. The profile discloses items that have to be essentially or selectively embodied for each application.

Figure 2:
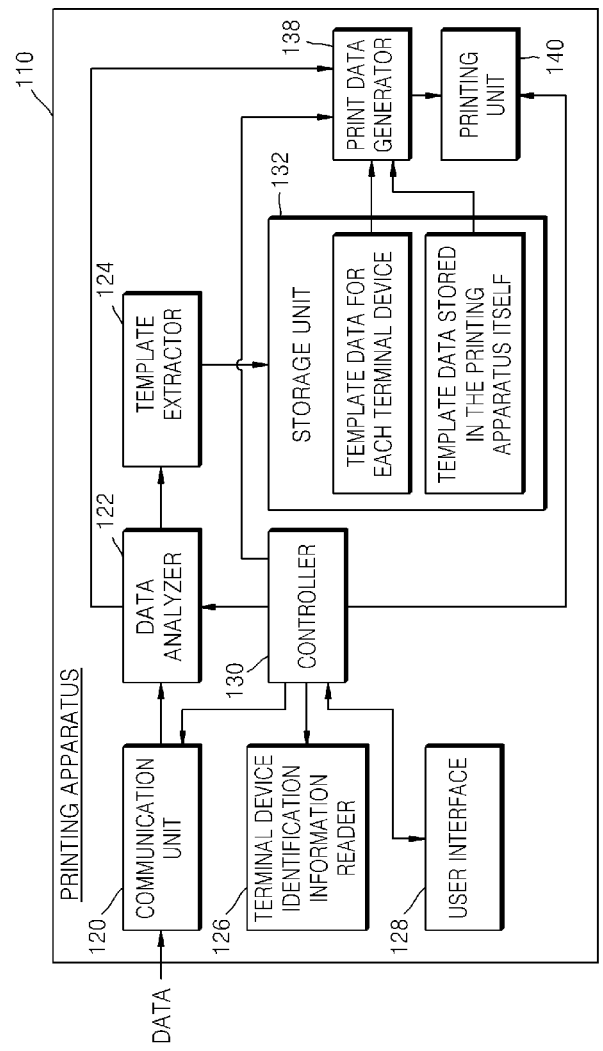
FIG. 2 is a block diagram illustrating a printing apparatus that prints format data transmitted from the terminal device using Bluetooth communication, according to an embodiment of the present invention.

FIG. 2 shows the printing apparatus 110 that prints format data transmitted from the terminal device 115 using Bluetooth communication, according to an embodiment of the present invention. The printing apparatus 110 includes a communication unit 120, a data analyzer 122, a template extractor 124, a terminal device identification information reader 126, a user interface 128, a controller 130, a storage unit 132, a print data generator 138, and a printing unit 140. According to other aspects of the present invention, the printing apparatus 110 may include additional and/or different units. Similarly, the functionality of two or more of the above units may be combined into a single component.

The communication unit 120 receives data from the terminal device 115 that is to be printed, such as format data, combination data, general document data, or image data, using Bluetooth communication. When receiving data to be printed from the terminal device 115, the terminal device identification information reader 126 reads identification information of the terminal device 115 that transmits the data.

The identification information of the terminal device 115 may be a Bluetooth device (BD) address.

The storage unit 132 is a storage space for storing the template data. In the storage unit 132, template data for each terminal device 115, which is extracted by the template extractor 124, and the previously stored template data, which is stored in the printing apparatus 110, are stored in separate spaces.

The data analyzer 122 analyzes the data that is received through the communication unit 120. Whether the received data is the format data, combination data, general document data, or image data is determined by analyzing the received data. Whether the received data is the format data is determined based on the presence of attribute items having the vCard format in the received data. Whether the received data is the combination data is determined based on is the presence of a tag included in the combination data.

As a result of the analysis of the data analyzer 122, when the received data is the combination data, the template extractor 124 extracts the template data from the combination data. The template extractor 124 stores the extracted template data by mapping the extracted template data with the identification information of the terminal device 120 as read by the terminal device identification information reader 126. When the template data corresponding to the terminal device 115 is previously stored in the storage unit 132, the template extractor 124 may store the extracted template data instead of the stored template data or additionally store the extracted template data independently of the previously stored template data.

FIG. 12 shows an example of a format in which template data is stored in the storage unit 132, according to an embodiment of the present invention. One or more template data is stored for each terminal device 115 and for each of the data formats (vCalendar, vCard, etc.).

The print data generator 138 generates print data using data received from the terminal device 115 through the communication unit 120. As a result of the analysis of the data analyzer 122, when the received data is format data, the print data generator 138 generates combination data by combining the received data with template data corresponding to the terminal device 115 that transmits the data stored in the storage unit 132, and transforms the generated combination data into print data. If there is at least one attribute that is not included in the template data corresponding to the terminal device 115 among attributes of the received format data, the template data is updated based on the at least one attribute. The combination data is generated by combining the updated template data with the received format data. The print data generator 138 generates print data by transforming the combination data into data that can be printed by the printing unit 140. However, when the template data corresponding to the terminal device 115 is not stored in the storage unit 132, the print data generator 138 generates the combination data by combining the template data that is stored in the storage unit 132 and provided by the printing apparatus 110 with the received format data. The print data generator 138 transforms the generated combination data into print data. If the received data is the combination data, general document data, or general image data, the data is directly transformed into the print data.

The user interface 128 receives various commands from a user, such as a print command and a command for storing template data, and displays information to the user regarding the status of the printing apparatus 110 or functions of the printing apparatus 110. The controller 130 controls the printing unit 140 and each component in the printing apparatus 110 based on a user command that is input through the user interface 128 and a result that is processed by the communication unit 120 and the data analyzer 122. The printing unit 140 prints print data that is generated by the print data generator 138. Various printing methods may be applied to print the print data, such as an electro-photographic method, an inkjet method, and the like.

Figure 3:
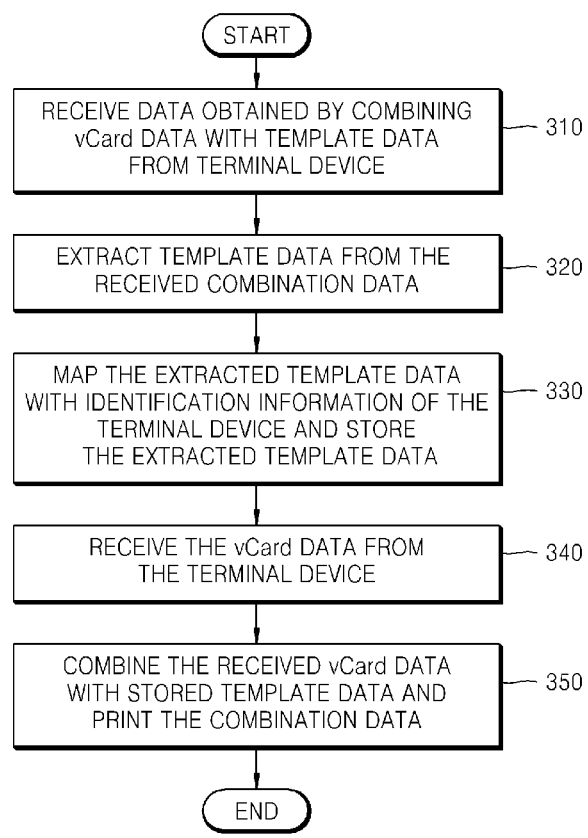
FIG. 3 is a flowchart of a process of printing format data that is transmitted from the terminal device using Bluetooth communication, according to an embodiment of the present invention.

FIG. 3 is a flowchart of a process of printing format data that is transmitted from a terminal device using Bluetooth communication, according to an embodiment of the present invention. Hereinafter, for convenience of description, the vCard data format is used, although any format may be employed, such as vCalendar, vMessage, or vNote. Although the formats have different attributes from each other, the formats are substantially the same type. Accordingly, aspects of the present invention may be applicable to other data formats, such as vCalendar, iCalendar, vMessage, and vNote in addition to vCard.

In operation 310, the printing apparatus 110 receives the combination data obtained by combining the vCard data with the template data from the terminal device. The combination data may be an XHTML-PRINT type. An example of a combination data file is shown in FIG. 7.

In operation 320, the printing apparatus 110 extracts the template data from the received combination data. The combination data file includes attribute items and values corresponding to the attribute items. As shown in FIG. 7, the attribute items represent a mobile phone number "Mobile", a home phone number "Home", and the like. For example, a value corresponding to the mobile phone number "Mobile" is 017-500-1234, and a value corresponding to the home phone number "Home" is 031-302-1234. The printing apparatus 110 can extract template data by deleting values corresponding to attribute items from the received combination data.

In operation 330, the printing apparatus 110 maps the template data extracted in operation 320 with identification information of the terminal device, and stores the template data. If the printing apparatus has previously stored basic template data provided by the printing apparatus 110, the template data extracted in operation 320 and the template data provided by the printing apparatus may be stored separately. When operations 310 to 330 are performed, the printing apparatus 110 stores template data corresponding to the terminal device 115 that transmits the combination data.

In operation 340, the printing apparatus 110 receives vCard data from the terminal device 115. The vCard data may be a text file. An extension of the text file may be "vcf". FIG. 6 shows an example of a vCard data file that includes attribute items and values corresponding to the attribute items similar to the combination data file.

In operation 350, the printing apparatus 110 generates combination data by combining the vCard data received in operation 340 with the template data stored in operation 330. The printing apparatus 110 transforms the combination data into print data and prints the print data. FIG. 8 shows an example of a result of printing the combination data.

Figure 4:
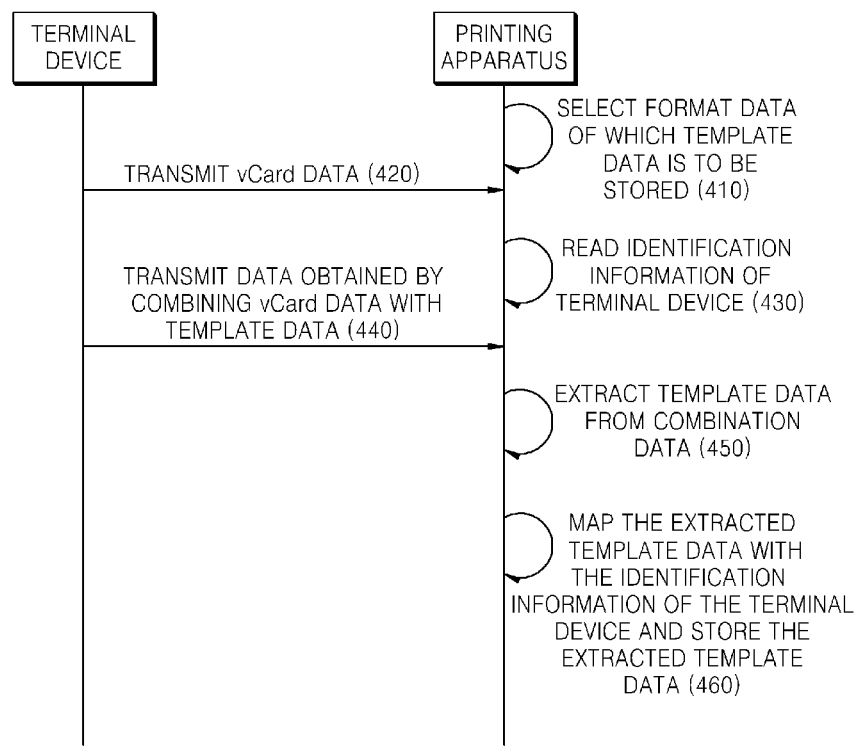
FIG. 4 is a flowchart illustrating operations shown in FIG. 3 in detail, according to an embodiment of the present invention.

FIG. 4 is a flowchart showing operations 310 to 330 shown in FIG. 3 in detail, according to an embodiment of the present invention. In operation 410, the printing apparatus 110 receives information from the user regarding a selection of format data of which template data is to be stored among the vCard data, vCalendar data, vMessage data, and vNote data. Here, the user selects the vCard format.

In operation 420, the terminal device 115 transmits the vCard data in response to the user command. The terminal device 115 transmits a data stream including the vCard data. The data stream includes identification information unique to the terminal device 115, for example, a BD address. The vCard data is transmitted not to print the vCard data, but to allow the printing apparatus 110 to read the identification information unique to the terminal device 115.

In operation 430, the printing apparatus 110 reads identification information of the terminal device 115 from the data stream that is received in operation 420.

In operation 440, the terminal device 115 transmits the combination data obtained by combining the vCard data with the template data in response to the user command. In operation 450, the printing apparatus 119 extracts template data from the received combination data.

In operation 460, the printing apparatus 110 maps the template data that is extracted in operation 450 with the identification information of the terminal device that is read in operation 430. The printing apparatus 110 stores the template data in the storage unit 132.

Figure 5A:
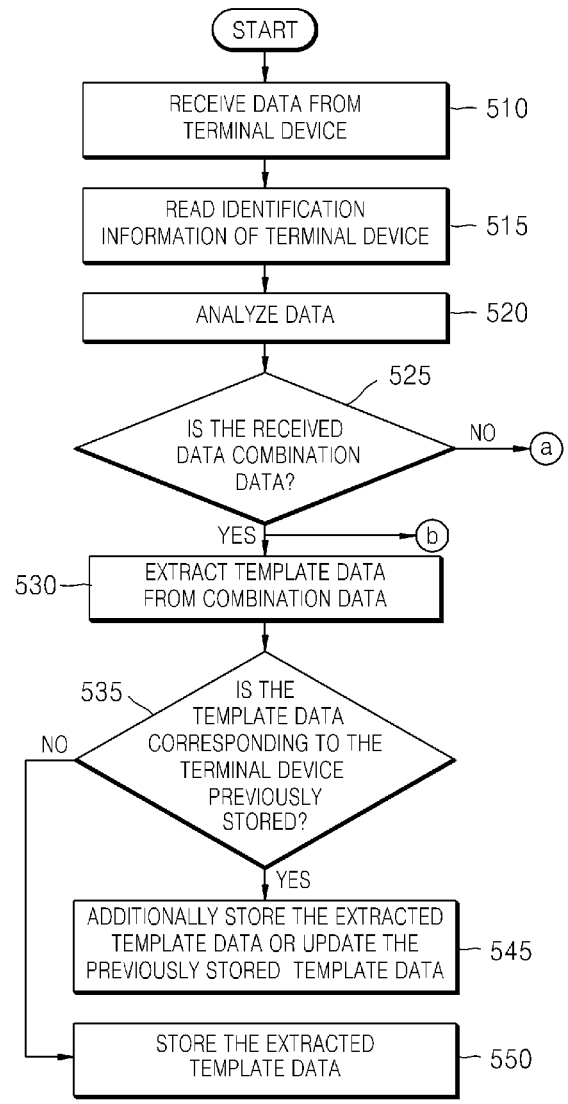
FIGS. 5A and B are flowcharts of a process of printing vCard data that is transmitted from a terminal device using Bluetooth communication, according to another embodiment of the present invention.
Figure 5B:
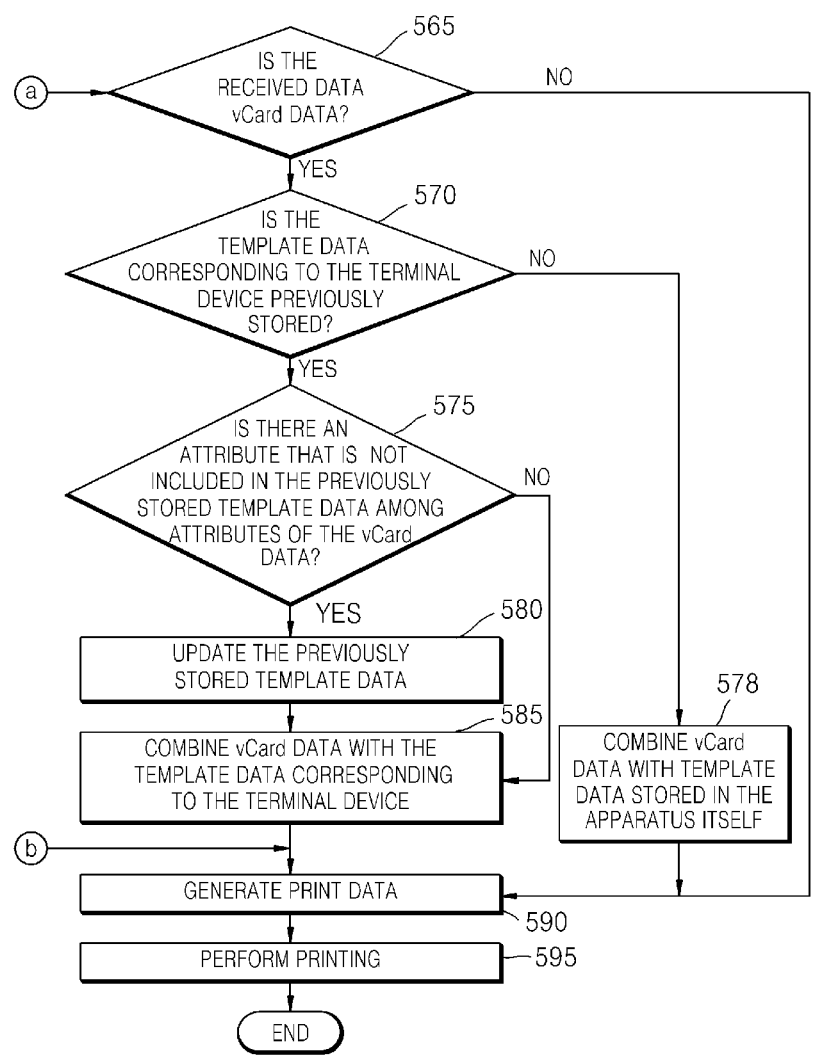

FIGS. 5A and 5B are flowcharts of a process of printing vCard data that is transmitted from a terminal device using Bluetooth communication, according to another embodiment of the present invention. Operations 310 to 330 shown in FIG. 3 or the operations shown in FIG. 4 may or may not be performed. If the operations of FIG. 3 or 4 are performed, the template data corresponding to the terminal device 115 is mapped with the terminal device 115 and stored in the printing apparatus 110.

In operation 510, the printing apparatus 110 receives data that is to be printed from the terminal device 115. In operation 515, the printing apparatus 110 reads identification information of the terminal device 115 from the data received in operation 510.

In operation 520, the printing apparatus 110 analyzes the data received in operation 510 and determines whether the received data is vCard data, combination data obtained by combining vCard data with template data, general document data, or image data. In operation 525, if the received data is the combination data, the process proceeds to operations 530 and 590. Otherwise, the process proceeds to operation 565.

In operation 530, the printing apparatus 110 extracts template data from the received combination data. As described above, the printing apparatus 110 can extract template data by deleting values corresponding to attribute items from the received combination data.

In operation 535, the printing apparatus 110 determines whether the template data corresponding to the terminal device that transmits data is stored. If the template data corresponding to the terminal device 115 is stored, the process proceeds to operation 545. Otherwise, the process proceeds to operation 550.

In operation 550, the printing apparatus 110 maps the template data extracted in operation 530 with the identification information of the terminal device 115 that is read in operation 515 and stores the template data.

In operation 545, the printing apparatus 110 may additionally store the template data extracted in operation 530 independently of the previously stored template, or may update the previously stored template data into the extracted template data as selected by the user through the user interface 128 of the printing apparatus 110. Operation 545 may be performed based on the selection result of the user. Alternatively, it may be previously determined with respect to the printing apparatus 110 whether the extracted template data is additionally stored or the previously stored template data is updated. If the storage space of the printing apparatus is sufficient, the printing apparatus may be designed so that the extracted template data is additionally stored. If the storage space of the printing apparatus is not sufficient, the printing apparatus 110 may be designed so that the previously stored template data is updated. Since the printing apparatus 110 may be designed so that the extracted template data is additionally stored, when there are a plurality of stored template data corresponding to the terminal device 115, the printing apparatus 110 displays each of the stored template data as a thumbnail through the user interface 128, so that the user may select the desired template data.

A process of updating the previously stored template data into the extracted template data is described below. Here, the previously stored template data has a type as shown in FIG. 10, and the combination data received from the terminal device 115 has a type obtained by combining the vCard data shown in FIG. 9 with the template data corresponding to the vCard data. As shown in FIGS. 9 and 10, the attribute items of the received combination data includes an attribute item for representing an address "ADD" that is not included in the previously stored template data. In this case, the previously stored template data shown in FIG. 10 is updated into the template data extracted from the received combination data. Accordingly, the updated template data has a type as shown in FIG. 11.

Returning to operation 525, as a result of the analysis in operation 520, if the received data is not the combination data, the process proceeds to operation 565. In operation 565, the printing apparatus 110 determines whether the data received from the terminal device is vCard data. If the received data is the vCard data, the process proceeds to operation 570. Otherwise, the process proceeds to operation 590. If the received data is not the vCard data, then the received data may be general document data or image data.

In operation 570, the printing apparatus 110 determines whether the template data corresponding to the terminal device 115 that transmitted the data is previously stored. If the template data is previously stored, the process proceeds to operation 575. Otherwise, the process proceeds to operation 578. In operation 578, the printing apparatus 110 combines the vCard data that is received from the terminal device 115 with template data that is stored in the printing apparatus 110 and provided by the printing apparatus 110.

In operation 575, the printing apparatus 110 determines whether there is an attribute corresponding to the terminal device that is not included in the previously stored template data among attributes of the vCard data received from the terminal device 115. If the attribute corresponding to the terminal device is present, the process proceeds to operation 580. Otherwise, the process proceeds to operation 585.

In operation 580, the printing apparatus 110 updates the previously stored template data corresponding to the terminal device 115. For example, if the vCard data received from the terminal device has the type as shown in FIG. 9 and the previously stored template data has the type as shown in FIG. 10, then the attribute for representing an address "ADD" among attributes of the received vCard data does not exist in the template data as shown in FIG. 10. Accordingly, in this case, the printing apparatus 110 updates the template data by adding the attribute "ADD" and a necessary tag to the stored template data. The updated template data may have the type as shown in FIG. 11.

In operation 585, the printing apparatus 110 generates combination data by combining the vCard data with the previously stored template data corresponding to the terminal device or the template data that is updated in operation 580.

In operation 590, the printing apparatus 110 generates print data by transforming the received combination data, the combination data that is combined in operation 585 or 578, received general document data, or image data, so that the printing unit 140 in the printing apparatus 110 can print the received combination data, the combination data that is combined in operation 585 or 568, received general document data, or received image data. In operation 595, the printing apparatus 110 prints the print data that is generated in operation 590.

According to aspects of the present invention, when the format data (such as the vCard data) is received and printed, not the template data that is provided by the printing apparatus but the template data that is provided by the terminal device is used. Accordingly, when the format data is printed using the printing apparatus according to aspects of the present invention, a printing operation is performed uniformly with each printing apparatus based on the template data that is provided by the terminal device.

In addition, it is possible to obtain the same printing result, since the same template data is used when transmitting format data from a terminal device by previously receiving combination data from the terminal device, extracting template data from the received combination data and storing the extracted template data or when transmitting combination data obtained by combining format data with template data. Furthermore, it is possible to obtain a printing result unique to the terminal device only by transmitting the format data without transmitting the combination data from the terminal device. Accordingly, it is possible to reduce the time used to combine the format data with the template data in the terminal device. In addition, it is possible to reduce a transmission time, since the format data has a smaller size than the combination data.

According aspects of the present invention, it is possible to obtain the same printing result even when different printing apparatuses print data with a predetermined format by transmitting the data with the predetermined format from a terminal device to the different printing apparatuses using Bluetooth communication, and to obtain the same printing result when printing data with a predetermined format by transmitting the data with the predetermined format from the terminal device or transmitting data obtained by combining data with a predetermined format with template data from the terminal device.

In addition, aspects of the present invention can also be embodied as computer readable codes on a computer readable recording medium. The computer readable recording medium may be any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of printing data having a predetermined format, the method comprising:
   receiving the data having the predetermined format from a terminal device using Bluetooth communication;
   combining the received data and a template data selected from a plurality of template data stored in a printing apparatus, wherein the selected template data corresponds to an identification information of the terminal device; and
   printing the combined data;
   wherein the identification information is unique to the terminal device to differentiate it from other terminal devices.

2. The method of claim 1, further comprising:
   receiving combination data including the data having the predetermined format and template data from the terminal device; and
   extracting the template data from the received combination data; and
   storing the extracted template data as template data as the stored template data corresponding to the terminal device.

3. The method of claim 2, wherein the extracting of the template data comprises storing the extracted template data or updating the stored template data with the extracted template data, when the template data corresponding to the terminal device is already stored.

4. The method of claim 3, wherein whether to store the extracted template data or update the stored template data is determined based on a selection result that is received through a user interface.

5. The method of claim 2, wherein the combination data and the template data are an XHTML-Print type.

6. The method of claim 1, wherein the predetermined format is at least one of a plurality of formats including a vCard format, a vCalendar format, a vMessage format, and/or a vNote format.

7. The method of claim 1, further comprising:
   mapping and storing the template data corresponding to the terminal device with identification information of the terminal device.

8. The method of claim 1, further comprising updating the stored template data, when at least one attribute that is not included in the stored template data is included in the received data with the predetermined format.

9. A non-transitory computer-readable recording medium having embodied thereon a computer program for executing the method of claim 1.

10. An apparatus to print data having a predetermined format, the apparatus comprising:
    a communication unit to receive data having the predetermined format from a terminal device using Bluetooth communication;
    a storage unit to store template data corresponding to identification information of the terminal device;
    a printing data generator to combine the received data and the stored template data selected from a plurality of stored template data and to generate print data using the combined data; and
    a printing unit to print the generated print data;
    wherein the identification information is unique to the terminal device to differentiate it from other terminal devices.

11. The apparatus of claim 10, further comprising a template extractor to extract the template data from received combination data when receiving the combination data including the data with the predetermined format and the template data from the terminal device, and to store the extracted template data in the storage unit as the template data corresponding to the terminal device.

12. The apparatus of claim 11, wherein the template extractor stores the extracted template data or updates the stored template data, when the template data corresponding to the terminal device is already stored in the storage unit.

13. The apparatus of claim 12, wherein whether to store the extracted template data or to update the previously stored template data is determined based on a selection result that is received through a user interface.

14. The apparatus of claim 11, wherein the combination data and the template data are an XHTML-Print type.

15. The apparatus of claim 10, wherein the predetermined format is at least one of a plurality of formats including a vCard format, a vCalendar format, a vMessage format, and/or a vNote format.

16. The apparatus of claim 10, wherein the template data corresponding to the terminal device is mapped with identification information of the terminal device and stored.

17. The apparatus of claim 10, wherein the stored template data is updated when at least one attribute that is not included in the stored template data is included in the received data with the predetermined format.

18. A method of storing template data, the method comprising:
    receiving combination data, including data having a predetermined format and template data from a terminal device, using Bluetooth communication;
    retrieving identification information of the terminal device from the combination data;
    extracting the template data from the received combination data;
    mapping the extracted template data with the identification information of the terminal device; and
    storing a result of the mapping which includes the extracted template data and the identification information.

19. The method of claim 18, wherein the predetermined format is at least one of a plurality of formats including a vCard format, a vCalendar format, a vMessage format, and/or a vNote format.

20. A method of printing data in a uniform fashion regardless of where the data is printed, the method comprising:
    receiving data having a predetermined format from a terminal device;
    retrieving stored template data selected from a plurality of stored template data, wherein the retrieved template data corresponds to the predetermined format and identification information of the terminal device;
    combining the received data and the retrieved template data; and
    printing the combined data and stored template data;
    wherein the identification information is unique to the terminal device to differentiate it from other terminal devices.

21. The method of claim 20, further comprising:
    receiving template data corresponding to a file format from the terminal device; and
    storing the received template data as the stored template data together with an identifier of the terminal device.

22. The method of claim 21, wherein, if the stored template data already exists, the storing of the received template data comprises:
    updating the stored template data with the received template data; or
    storing the received template data as additional template data.

23. The method of claim 20, further comprising:
    combining the data having the predetermined format with default template data corresponding to the predetermined format but not corresponding to the terminal device, if the stored template data is not available; and
    printing the combined data and default template data.

24. A printing system comprising:
    a printing apparatus to receive data having a predetermined format, to extract stored template data selected from a plurality of template data, wherein the extracted template data corresponds to the predetermined data, to combine the data with the stored template data, and to print the combined data; and
    a terminal device to transmit the data having a predetermined format to the printing apparatus;
    wherein the stored template data has an identifier corresponding to the terminal device;
    wherein the identifier is unique to the terminal device to differentiate it from other terminal devices.

* * * * *